July 18, 1961  E. C. CAPE  2,992,504
AUTOMATIC FISH LINE JIGGER
Filed May 29, 1959
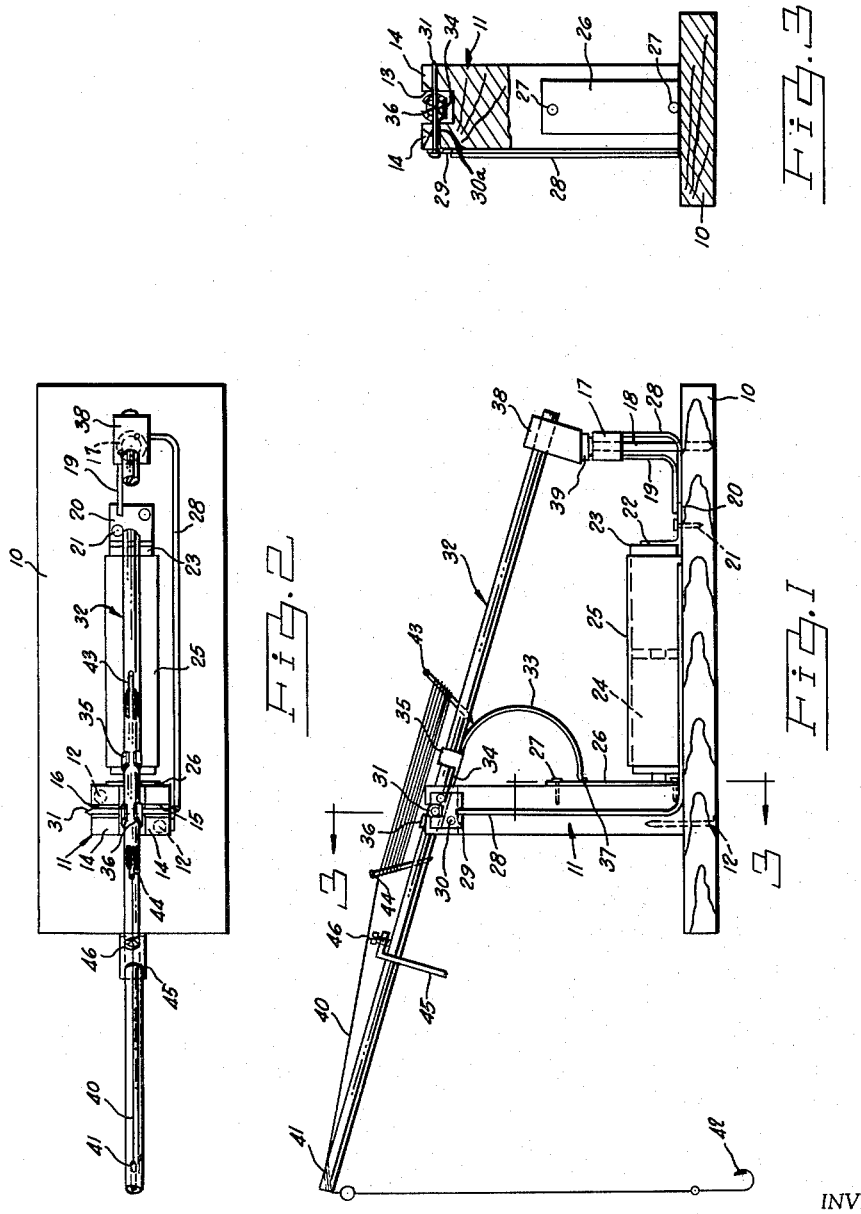
INVENTOR.
ELMER C. CAPE
BY
ATTORNEYS

United States Patent Office 2,992,504
Patented July 18, 1961

2,992,504
AUTOMATIC FISH LINE JIGGER
Elmer C. Cape, 14022 Sarasota, Detroit, Mich.
Filed May 29, 1959, Ser. No. 816,831
4 Claims. (Cl. 43—19.2)

This invention relates generally to the fishing art and, more particularly, to an automatic device for imparting a rocking movement to a fishing rod.

It is an important object of this invention to provide a fishing apparatus particularly adapted for ice fishing or the like and which incorporates a magnet means for actuating a fishing rod in and up and down motion to activate a fishing bait carried by the rod.

It is another object of the present invention to provide a fishing apparatus which includes a rockably mounted fishing rod having a permanent magnet on the rear end thereof which functions to move the rear end of the rod downwardly toward an electro-magnet which produces a like magnetic force that repeals the permanent magnet so as to force the rod upwardly to provide a rocking movement thereto.

It is a further object of the present invention to provide an automatic fish line jigger which is compact, light weight, economical of manufacture, efficient in operation, and which incorporates a self-contained power source so as to permit its use in remote areas.

It is still another object of the present invention to provide a fishing apparatus for automatically moving a fish line so as to move the bait or lure carried thereon in a vertical up and down direction and thereby attract the attention of surrounding fish.

Oher objects, features and advantages of this invention will be apparent from the following detailed description and appended claims, reference being had to the accompanying drawing forming a part of the specification wherein like reference numerals designate corresponding parts of the several views.

In the drawing:

FIG. 1 is a side elevational view of a fishing apparatus made in accordance with the principles of the invention and with some of the parts broken away;

FIG. 2 is a top plan view of the structure illustrated in FIG. 1 and with parts broken away; and, FIG. 3 is an elevational sectional view of the structure shown in FIG. 1, taken along the line 3—3 thereof and looking in the direction of the arrows.

Referring now to the drawing wherein is shown the preferred embodiment of the invention, the numeral 10 indicates a base member which may be made from any suitable material as from a flat board. The numeral 11 generally indicates the upright or vertical column which may be made from any suitable material. As illustrated, the column 11 is made from wood and is fixedly secured to the base 10 adjacent the forward end thereof by means of the nails 12. The upper end of the column 11 is bifurcated by means of the longitudinal slot 13 to provide the pair of spaced apart parallel fulcrum plates 14. The plates 14 are provided with the transverse central grooves 15 and 16 which function as aligned fulcrum seats, as more fully described hereinafter.

As best seen in FIG. 1, an electro-magnet is formed on the rear end of the base 10 and includes the coil 17 which is wound around the upper end of the vertically disposed nail 18 that is fixed in the base 10. One end of the coil 17 is electrically connected by means of the conductor wire 19 to the contact plate 20 which is fixedly secured to the base 10 by any suitable means, as by the nails 21. Extended upwardly from the plate 20 is the vertically disposed contact member 22 which is adapted to electrically contact the one end of a suitable electric battery 23. The battery 23 is disposed on the base 10 and is aligned and in electrical contact with a second battery 24. The batteries 23 and 24 may be any suitable flashlight batteries and are secured together by means of the tubular cover 25.

The battery 24 is adapted to electrically contact the conductor metal strip 26 which is fixedly secured to the rear vertical face of the column 11 as by means of the nails 27. It will be understood that the contact plate 22 is flexible and functions to exert a spring-like pressure against the battery 23, whereby the batteries are thus held in position between the plate 22 and the plate 26.

The other end of the coil 17 is electrically connected by means of the conductor wire 28 to the conductor plate 29 which is mounted on the side of the column 11 near the upper end thereof by means of the nail 30. As shown in FIGS. 1 and 2, the wire 28 runs along the base 10 and up the side of the column 11. The plate 29 is provided with a portion 30a which is struck from the plate 29 and bent inwardly to lie in the groove 15. As best seen in FIG. 3, the metal plate portion 30a is adapted to be in electrical contact with the cross pin 31 which is fixedly mounted diametricaly through the fishing rod 32 at a substantially intermediate point thereof. The pin 31 is metallic and is in further electrical contact with the clamp member 36 which is clamped into the fishing rod 32. The clamp 36 is integral with the metal strip 34 which extends rearwardly on the under side of the rod 32 and is integral with the second clamp 35. As shown in FIG. 1, a curved metal strip 33 is integrally connected at one end thereof to the metal clamp 35, and the other end thereof is reversely curved as at 37 and is adapted to electrically contact the strip 26 when the fishing rod 32 is pivoted to the position shown in FIG. 1.

As shown in FIGS. 1 and 2, a block 38 is adjustably mounted on the rear end of the rod 32 and carries on the lower face thereof a permanent magnet 39 which is adapted to be disposed over the electro-magnet when in the position shown in FIG. 1. As shown in FIGS. 1 and 2, the rod 32 is provided with the usual fish line 40 which passes through the slot 41 formed in the front end of the rod and which carries the usual fish hook, lure or fly 42. The fish line 40 is adapted to have the excess portion thereof wound around the nails 43 and 44 on the upper side of the rod 32. A counter balance weight as 45 is slidably mounted on the front end of the rod 32 and is adapted to be adjustably secured in place by means of the screw 46.

In use, the fishing apparatus would be disposed on the ice adjacent an open hole therethrough and with enough of the fish line let out so as to permit the hook and the bait carried thereon to be disposed in the water at the proper fishing depth. The operator would then mount the batteries in place as shown in FIG. 1 and with the weight 45 in an adjusted position to give a suitable rocking motion to the rod, the apparatus would automatically start to rock the rod 32. When starting with the rod in the position shown in FIG. 1, the metal strip 33 which forms a spring-like contact with the strip 26 completes a circuit through the batteries and to the coil 17, whereby the electro-magnet is energized to create a magnetic force of a polarity such as will repel the permanent magnet 39. The repelling of the permanent magnet 39 forces the rear end of the rod 32 upwardly or counter clockwise as viewed in FIG. 1 to thereby rock the rod and move the fish line 40 downwardly into the water. When the rod 32 is thus rocked, the spring contact arm or plate 33 will be disengaged from the plate 26 and a circuit energizing the electro-magnet will be broken. The rod 32 then rocks clockwardly until the spring arm 33 again contacts the plate 26 to energize the electro-magnet again and create another repelling action. The aforedescribed rocking motion is automatically continued with the rod 32 being continuously rocked on the fulcrum created by the slots 15 and 16 on the top of the column 11. The rocking motion will continue until the batteries are removed. Experience has shown that the fishing apparatus of the present invention is efficient and durable in operation. While the device of the present invention is especially adapted for ice fishing, it will be obvious that it may be used for other types of fishing as when fishing from a pier or the like.

While it will be apparent that the preferred embodiment of the invention herein disclosed is well calculated to fulfill the objects above stated, it will be appreciated that the invention is susceptible to modification, variation and change without departing from the proper scope or fair meaning of the subjoined claims.

What I claim is:

1. In a fishing apparatus of the class described, the combination comprising: a base; a column mounted on said base; a fulcrum on said column; a fishing rod rockably mounted on said fulcrum; a permanent magnet mounted on the rear end of the fishing rod; an electro-magnet mounted on said base; said rod being counter-balanced so that the permanent magnet normally rests on the electro-magnet; and, electric power means including a switch means operatively connected to said electro-magnet, whereby, said electro-magnet may be successively energized to repel said permanent magnet to impart a rocking movement to said fish rod when said switch means is closed with the permanent magnet disposed in the normal position resting on said electro-magnet.

2. In a fishing apparatus of the class described, the combination comprising; a base; a column mounted on said base; a fulcrum on said column; a fishing rod rockably mounted on said fulcrum; a permanent magnet mounted on the rear end of the fishing rod; an electro-magnet mounted on said base; said rod being counter-balanced so that the permanent magnet normally rests on the electro-magnet; a battery means mounted on said base; and, circuit means including a switch means connecting said battery means with said electro-magnet for successively energizing the same to repel the permanent magnet to impart a rocking movement to said fishing rod when said switch means is closed with the permanent magnet disposed in the normal position resting on said electro-magnet.

3. In a fishing apparatus of the class described, the combination comprising: a base; a column mounted on said base; a fulcrum on said column; a fishing rod rockably mounted on said fulcrum; a permanent magnet mounted on the rear end of the fishing rod; an electro-magnet mounted on said base; said rod being counter-balanced so that the permanent magnet normally rests on the electro-magnet; a battery means mounted on said base; and, circuit means connecting said battery means with said electro-magnet, including a spring contact arm carried by said rod for opening and closing the circuit, for successive energization of the electro-magnet to repel the permanent magnet when it normally rests on the electro-magnet to impart a rocking movement to said fishing rod.

4. In a fishing apparatus of the class described, the combination comprising: a base, a column mounted on said base; a fulcrum on said column; a fishing rod rockably mounted on said fulcrum; a permanent magnet mounted on the rear end of the fishing rod; an electro-magnet mounted on said base; said rod being counter-balanced so that the permanent magnet normally rests on the electro-magnet; a battery means mounted on said base; circuit means connecting said battery means with said electro-magnet, including a spring contact arm carried by said rod for opening and closing the circuit, for successive energization of the electro-magnet to repel the permanent magnet when it normally rests on the electro-magnet to impart a rocking movement to said fishing rod; and, a counter-balance means adjustably mounted on the forward end of said rod to counter-balance the rod to the normal position with the permanent magnet resting on the electro-magnet.

References Cited in the file of this patent

UNITED STATES PATENTS

| | | |
|---|---|---|
| 2,714,270 | Premo | Aug. 2, 1955 |
| 2,746,198 | Smith | May 22, 1956 |
| 2,758,407 | Speidell | Aug. 14, 1956 |